United States Patent [19]
Naito et al.

[11] Patent Number: 5,859,831
[45] Date of Patent: Jan. 12, 1999

[54] DISK CARTRIDGE

[75] Inventors: Takashi Naito; Tamotsu Maeda, both of Kanagawa, Japan

[73] Assignee: Sony Corporation, Tokyo, Japan

[21] Appl. No.: 131,332

[22] Filed: Oct. 4, 1993

[30] Foreign Application Priority Data

Oct. 7, 1992 [JP] Japan .................................. 4-268342

[51] Int. Cl.⁶ ........................ G11B 3/70; G11B 11/00; G11B 23/03
[52] U.S. Cl. ...................... 369/291; 369/13; 360/133
[58] Field of Search .................. 369/291, 13; 360/133, 360/135

[56] References Cited

U.S. PATENT DOCUMENTS

| | | | |
|---|---|---|---|
| 4,750,064 | 6/1988 | Nemoto et al. | 360/99.05 |
| 4,908,809 | 3/1990 | Tadokoro et al. | 369/13 |
| 4,970,618 | 11/1990 | Kato et al. | 360/133 |
| 5,007,040 | 4/1991 | Okauchi | 360/133 |
| 5,090,010 | 2/1992 | Takahashi | 369/291 |
| 5,206,844 | 4/1993 | Ishii | 369/291 |
| 5,274,612 | 12/1993 | Sato et al. | 369/291 |

FOREIGN PATENT DOCUMENTS 5-41044  2/1993  Japan .................................. 360/137

*Primary Examiner*—Allen T. Cao
*Attorney, Agent, or Firm*—Limbach & Limbach L.L.P.

[57] ABSTRACT

A disk cartridge has an overwritable magneto-optical disk rotably mounted therein. The overwritable magneto-optical disk cartridge is usable in compatible type disk drives which also accept conventional, non-overwritable, magneto-optical disks. A magnetic initializing device is provided within the cartridge casing such that a sufficient magnetic field may be generated within the cartridge for effecting overwrite operations. Accordingly, no such magnetic initializing device need be provided in a disk drive and a size, weight and cost of such disk drives may be reduced, while cartridge performance may be reliably improved.

9 Claims, 8 Drawing Sheets

DISK CARTRIDGE

BACKGROUND OF THE INVENTION

1. Field of the Invention

The present invention relates generally to a disk cartridge. Specifically, the present invention relates to a magneto-optical disk cartridge in which an overwrite type magneto-optical disk is provided and magnetic initializing means for generating a sufficient magnetic field for utilizing the overwrite type magneto-optical disk is provided within the cartridge casing.

2. Description of the Prior Art

Generally, magneto-optical disks require that old data be erased in one procedure before new data may be written. This erasure step is time consuming. Recently, an 'overwrite' type magneto-optical disk has been developed in which it is possible to write new data directly over previously held data via a light intensity modulation method. Referring to FIGS. 6–8, such conventional and overwritable type magneto-optical disk cartridges and a disk drive arrangement for same will be explained hereinbelow.

FIG. 7, shows a disk drive 100 for magneto-optical disk cartridges and FIG. 6 shows a cutaway perspective view of a cartridge housing 1' mounting therein a conventional magneto-optical disk 10' and/or an overwritable disk cartridge 1" with an overwritable magneto-optical disk 10" mounted therein, both cartridge types being compatible with the disk drive 100 of FIG. 7. The conventional disk cartridge 10' has a single data layer according to a standard IOS construction and the overwritable magneto-optical disk 10" has a two layer construction according to the light intensity modulation method, in which a first data layer and a second rewrite layer are provided. Hereinbelow, for simplicity, both types of magneto-optical disks will be referred to by the numeral 10 and both types of cartridge by the numeral 1.

The disk drive 100, for utilizing the above described magneto-optical disk cartridges 1, includes a base frame, or chassis 101 having a spindle motor 102 mounted at a substantially center portion thereof for rotatably engaging the magneto-optical disk 10. For scanning the magneto-optical disk 10 in the radial direction thereof during read and/or write operation, a carriage 103 is provided with an optical pickup 104 mounted thereon. The carriage 103 is driven via a guide shaft (not shown) engaging a linear motor (not shown). Also mounted on the chassis 101 is a front panel 110. Above a chassis 101 is mounted a loading plate 111 which has a mounted slider (not shown) which is movable in forward and reverse and well as up and down directions for effecting loading of the magneto-optical disk cartridge 1. For supporting the magneto-optical disk cartridge 1 above the spindle motor 102, a cartridge holder 112 is provided at a lower side of the loading plate 111. Also provided is a sub-holder 113 for positioning the cartridge 1, at a position opposing the optical pickup 104, for scanning the magneto-optical disk 10 in the radial direction. The sub-holder 113 has mounted thereon a biasing magnet 114. Although not shown in the drawings, the sub-holder 113 is connected to a drive mechanism at a front side thereof for effecting upward and downward movement thereof. Also provided are an optical lens 105 mounted opposing the optical pickup 104, a optical setting portion 106 and a base plate 108.

Referring now to FIGS. 7 and 8, mounted at a position above the cartridge 1 a magnetic initializing means 115 is provided at a position which is above the upper surface of the magneto-optical disk 10. The sub-holder 113 may be stopped at a predetermined position in relation to the biasing magnet 114, which is an electromagnet, by a stop screw or the like. The magnetic initializing means 115 comprises a back yoke 115a having basically an inverted U shape for enhancing magnetic intensity and, mounted in a lower central portion thereof, an initializing magnet 115b is provided. By way of a driving mechanism (not shown) the magnetic initializing means 115 can be controlled so as to move adjacent to the casing 2 (see FIG. 6) of the cartridge 1, or to separate from the cartridge casing 2. Via the drive mechanism which brings the cartridge casing 2 into contact with the magnetic initializing means, a type of cartridge 1, that is, a conventional cartridge 1' or a overwritable cartridge 1", may be detected and the disk drive 100 may be set electronically and mechanically according to the detected disk type.

Specifically, if a surface magnetism-of $6000e$ or less is detected, it is assumed that a magnetic cartridge 1' housing a conventional magneto-optical disk 10' has been loaded and the magnetic initializing means 115 is moved to be remote from the casing 2 of the conventional magneto-optical disk cartridge 1'. Alternatively, when an overwritable magneto-optical disk cartridge 1" utilizing an overwritable magneto-optical disk 10" is loaded, the magnetic initializing means 115 is moved so as to be adjacent the outer surface of the casing 2 of the cartridge 1". In this condition, in the presence of a magnetic output kOe from the magnetic initializing means 115, only an overwritable type magneto-optical disk cartridge 1" can be utilized. A conventional magneto-optical disk cartridge 1' may not be read in this condition and, data on such a conventional magneto-optical disk 10' may be lost inadvertently.

Referring to FIG. 6, the construction of such magneto-optical disk cartridges 1' and 1" will be described hereinbelow. First, the casing 2 is generally comprised of a upper (first) shell 2a and a lower (second) shell 2b and the magneto-optical disk 10' or 10" is rotatably mounted between the upper and lower shells 2a and 2b. Openings 3, 3 are formed respectively in each of the upper and lower shells 2a and 2b at a position which opposes that of the optical pickup 104 when the cartridge 1 is loaded in the disk drive 100. Openings 3 are covered, when the cartridge 1 is not loaded, by a slidably disposed shutter 4 which is mounted on the outer side of the casing 2, astride the upper and lower shells 2a, 2b. Further, formed in the lower shell 2b, media sensor holes, such as an alignment hole 5, an A surface discriminating opening 6, a B surface discriminating opening 7, a gripper slot 8, a positioning hole 9, and the like, are provided.

Japanese Patent Application 4-173004 discloses a magneto-optical disk cartridge and disk drive therefore similar in construction to the above-described. According to this disclosure, when data is to be overwritten on a overwritable type magneto-optical disk cartridge 1" housing an overwritable magneto-optical disk 10", the magnetic initializing means 115 produces a magnetic output of 3–7 kOe and the magnetic polarity of the auxiliary layer of the overwritable magnetic disk 10" is set in a predetermined direction. After setting of the polarity direction of the auxiliary layer, on rotation of the magneto-optical disk 10", the bias magnet 114, which is mounted at a position directly over the optical pickup 104, is active to invert the output of the magnetic initializing means so as to produce a bias magnetic field of 200–400 Oe required by the overwritable magneto-optical disk 10". The object lens 105 of the optical pickup 104 is active to output a laser beam onto the surface layer of the overwritable magneto-optical disk 10" so as to neutralize the magnetic polarity of the surface layer (laser irradiation at a temperature above Curie temperature). During and during a cooling period after irradiation, the direction of magnetic polarity of the surface layer is determined and writing of data is accomplished. Further, according to the above, an improvement is available in that a relatively weak laser may be used for writing an a magnetic polarity of the surface layer is altered according to the polarity of light during laser irradiation.

Further, when a conventional magneto-optical disk cartridge 1' utilizing a conventional magneto-optical disk 10' is to be utilized in the disk drive 100, the drive mechanism is active beforehand to move the magnetic initializing means 115 away from the cartridge 1' to prevent the strong magnetic field thereof from influencing the conventional magneto-optical disk 10'. Then the reading and/or writing operation is carried out via the bias field of the bias magnet 114 and the optical pickup 104.

However according to such arrangements for utilizing overwritable magneto-optical disks 10" in a cartridge 1" to be loaded in a disk drive 100. Since a relatively large magnet must be utilized in order to produce the approximately 3 kOe magnetic field of the magnetic initializing means 115, and the magnetic initializing means must have room to be moved toward and away from a disk cartridge 1 which is loaded into the disk drive 100, the weight of the disk drive is increased and the 'dead space' required for movement thereof increases the necessary thickness of the disk drive unit. Also, the above imperatives along with the driving mechanism required for the magnetic initializing means cause cost of the disk drive unit to increase. Thus, there is a need to provide an overwritable magneto-optical disk cartridge which may be utilized in a manner allowing a reduction in the weight, thickness and cost of the disk drive unit.

SUMMARY OF THE INVENTION

It is therefore a principal object of the present invention to overcome the drawbacks of the prior art.

It is a further object of the present invention to provide a magneto-optical disk cartridge which may be utilized in drives In order to accomplish the aforementioned and other objects, a disk cartridge is provided. A disk cartridge according to the present invention includes a cartridge casing, an overwrite type magneto-optical disk rotatably mounted in the cartridge casing, and a magnetic initializing means. The magnetic initializing means includes a yoke and magnetic means disposed within the cartridge casing proximate to a radial portion of the overwrite type magneto-optical disk so as to generate a magnetic field sufficient for effecting overwrite operation of the overwrite type magneto-optical disk.

BRIEF DESCRIPTION OF THE DRAWINGS

In the drawings:

FIG. 2(*b*) is a side view of the magnetic initializing means of FIG. 1;

FIG. 4(*c*) shows a disk support projection provided within the disk housing for supporting a peripheral edge of a magneto-optical disk;

DESCRIPTION OF THE PREFERRED EMBODIMENT

Figure 6:
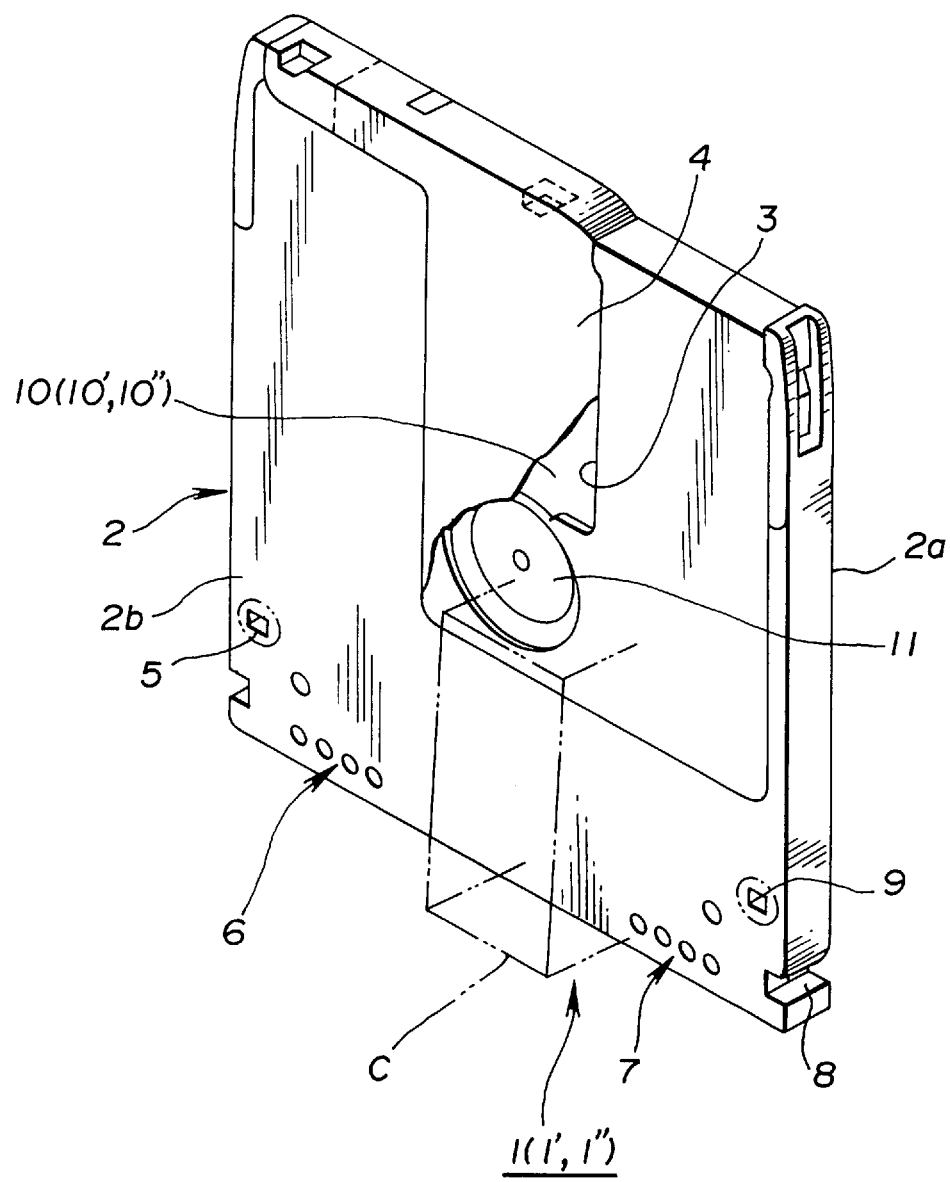
FIG. 6 is a perspective view of a cartridge casing which may rotatably mount either a conventional magneto-optical disk, or an overwritable type magneto-optical disk.
Figure 7:
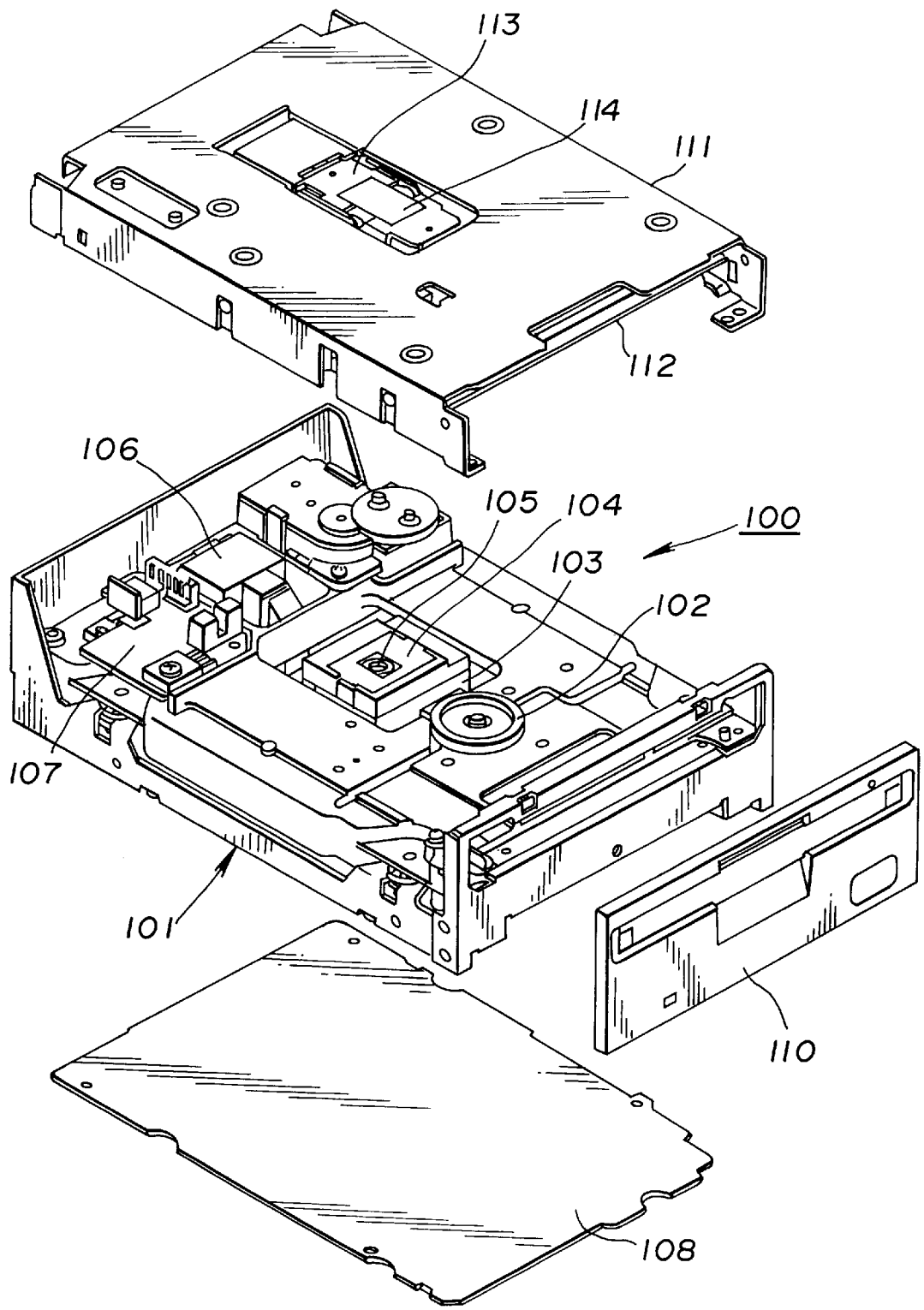
FIG. 7 is an exploded perspective view of a conventional disk drive for such overwritable magneto-optical disk cartridges as shown in FIG. 6.
Figure 8:
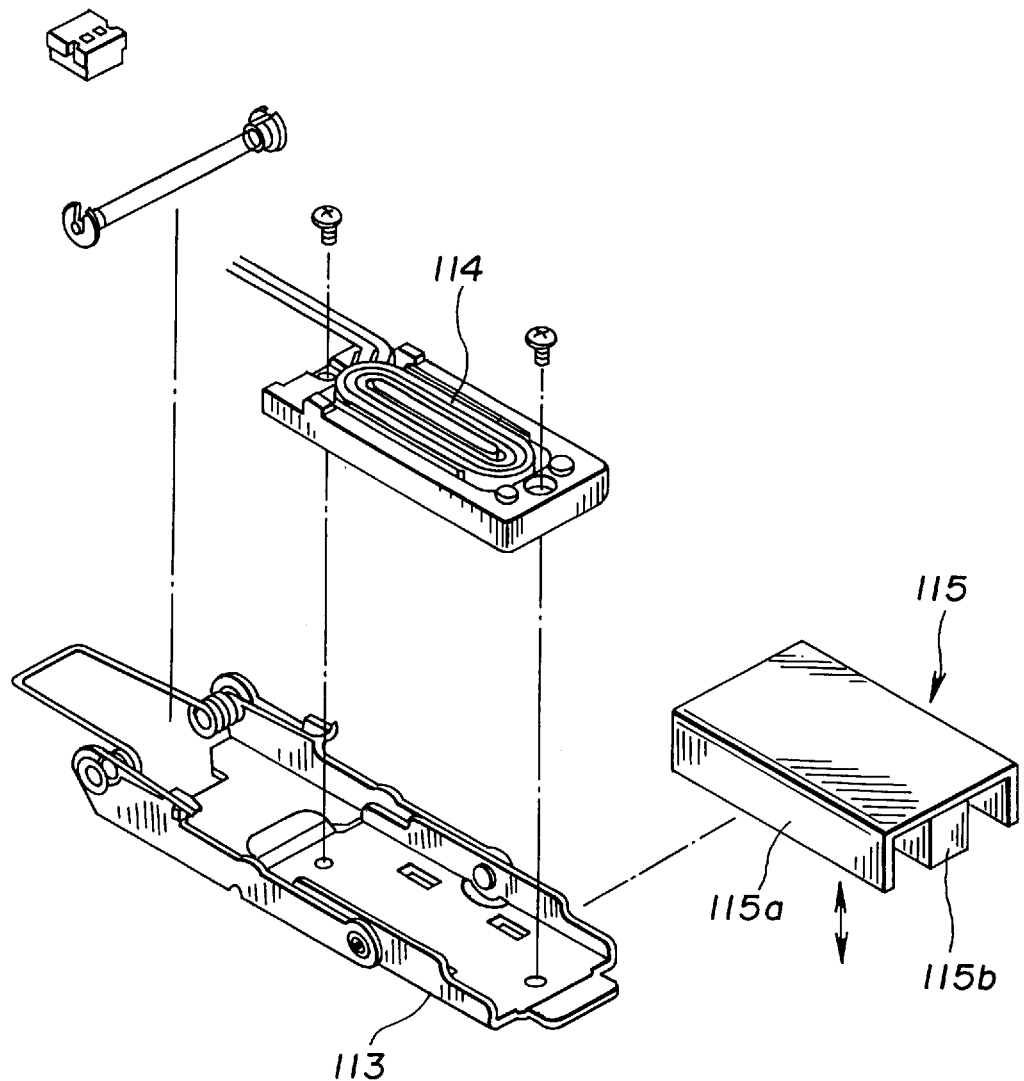
FIG. 8 is an exploded perspective view of a known magnetic initializing means.

Referring now to the drawings, particularly to FIGS. 1–5, the preferred embodiment of the invention will be explained in detail. It will be noted that, in the description, parts common to those described in connection with the prior art will be referred to by like numerals. Further, the cartridge casing of FIG. 6 and the disk drive arrangement of FIG. 7 will also be referred to in explaining the preferred embodiment of the invention.

Figure 1:
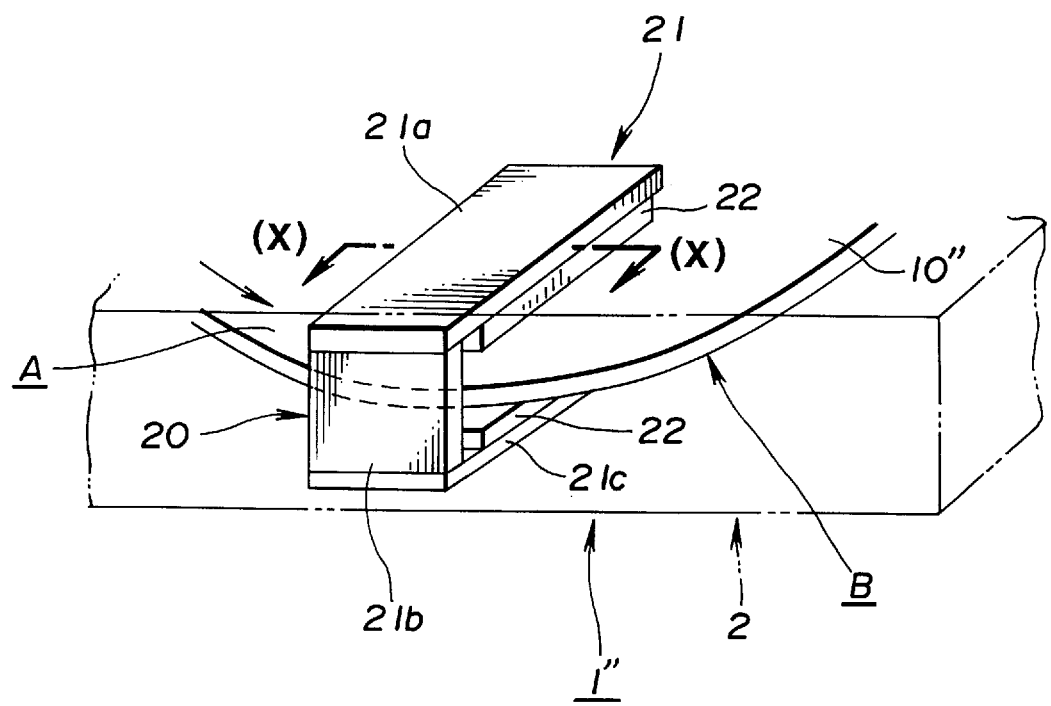
FIG. 1 is a perspective view of a magnetic initializing means provided in a cartridge casing according to the invention.

Referring now to FIG. 1, an enlarged cutaway perspective view of an overwritable magneto-optical disk 10" is shown. As described in connection with the prior art, the overwritable magneto-optical disk 10" is rotatably mounted in a casing 2 of a magneto-optical disk cartridge 1". As may be seen, at a position below the shutter 4 of the disk cartridge (indicated as 'C' in FIG. 6) a magnetic initializing means 20 is provided. The magnetic initializing means 20 comprises a yoke 21 which may be formed of a metallic material, including upper arm 21*a*, a spacer 21*b* and a lower arm 21*c*, collectively forming a reverse 'C' shape. As seen in the drawing, the magnetic initializing means is arranged such that a radial portion of the overwritable magneto-optical disk 10" passes between the upper and lower arms 21*a*, 21*c* of the magnetic initializing means 20 as it rotates. Provided on opposed inner surfaces of the upper and lower arms 21*a*, 21*c*, a pair of initalizing magnets 22, 22 are provided on each of the upper and lower arms 21*a*, 21*c* respectively. Each pair of initializing magnets 22, 22, 22, 22 are arranged in parallel in the radial direction of the disk such that the radial portion of the magneto-optical disk 10" passes between the four initializing magnets 22, 22, 22, 22, during rotation.

Figure 2:
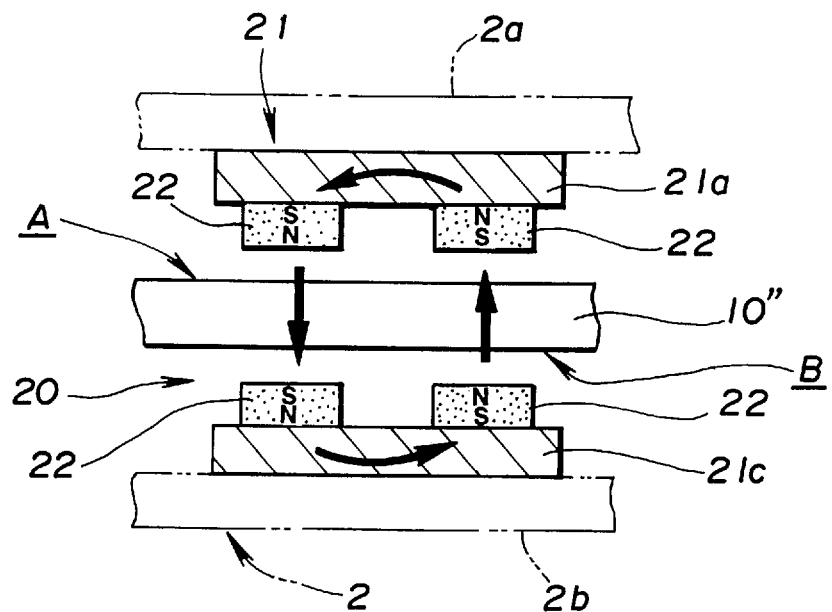
FIG. 2(*a*) is a cross-sectional view of the magnetic initializing means of the invention taken along line X—X of FIG. 1.
Figure 2:
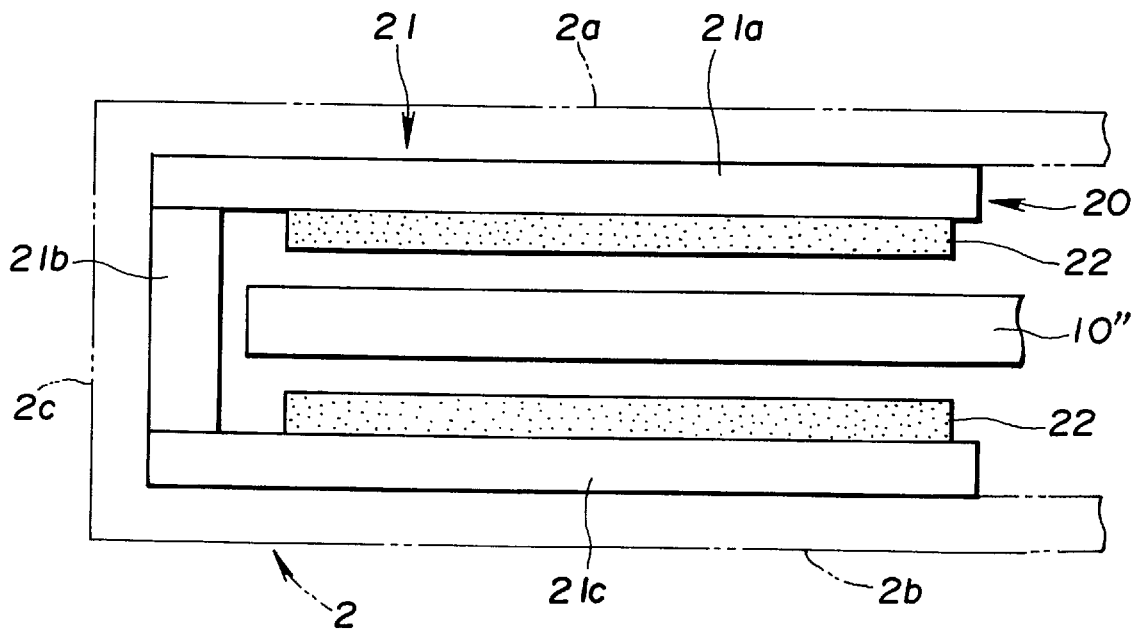

Referring to FIG. 2(*a*), a magnetic circuit established by the initializing magnets 22, 22, 22, 22 is shown. As may be seen in FIG. 2, the upper pair of initalizing magnets 22, 22 are arranged in reversed polarity such that the S pole of the upper right-hand initializing magnet 22 faces the upper (A) surface of the magneto-optical disk 10" while the N pole of the upper left-hand initializing magnet 22 faces the A surface of the magneto-optical disk 10". On the other hand, the lower pair of initalizing magnets 22, 22 are arranged identically to the upper pair 22, 22, they face the lower (B) surface of the disk, such that the N pole of the lower right-hand initializing magnet 22 faces the lower (B) surface of the magneto-optical disk 10" while the S pole of the lower left-hand initializing magnet 22 faces the B surface of the magneto-optical disk 10". According to the above, a substantially circular, counterclockwise magnetic field is established.

Referring to FIG. 2(b), the spacer 21b of the yoke 21, is provided to oppose the attraction forces generated by the magnetic strength of the magnetic circuit established by the initializing magnets 22, 22, 22, 22. Attraction forces generated which cannot be compensated for by provision of the spacer 21b, may be compensated by increasing a strength of the material of the upper and lower shells 2a, 2b and the side wall 2c.

Figure 3A:
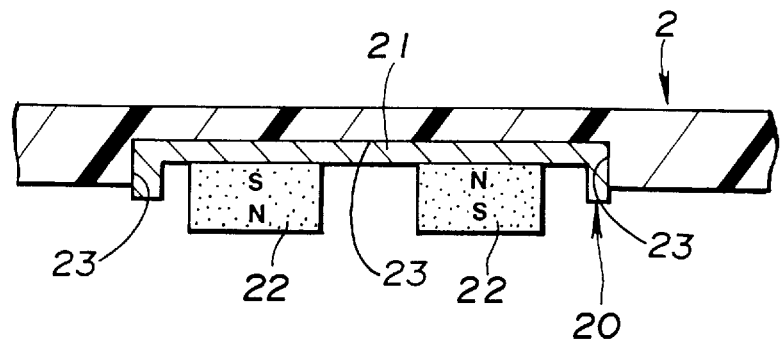
FIGS. 3(*a*)–3(*c*) show alternative embodiments of a magnetic initializing means provided within a cartridge casing according to the invention.
Figure 3B:
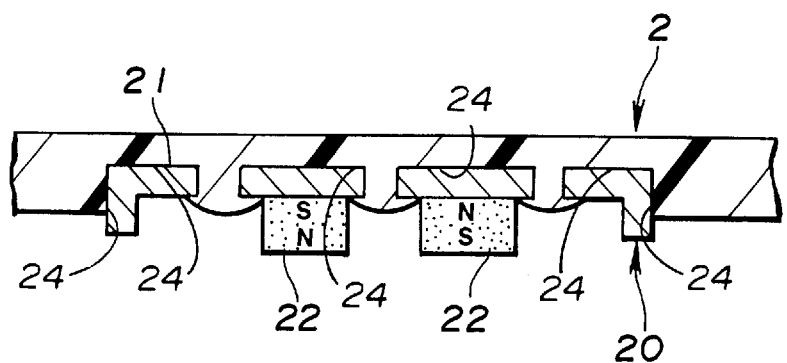
Figure 3C:
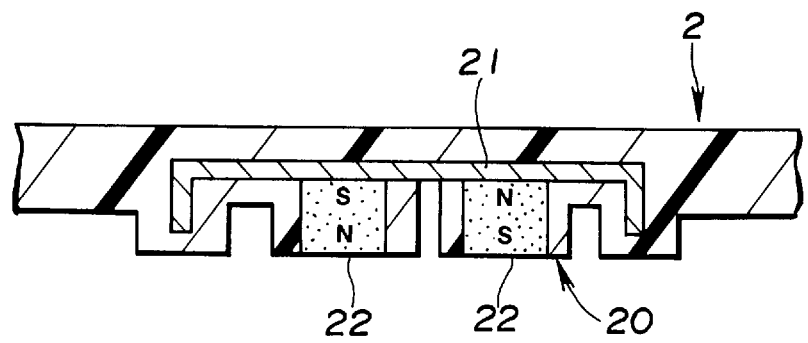

FIGS. 3(a)–3(b) show alternative embodiments of a magnetic initializing means 20 according to the present invention. Although only the upper shell 2a is shown in the drawings, it will be understood that the same arrangement may be applied to the lower shell 2b. Referring to FIG. 3(a) it may be seen that according to this embodiment, the yoke 21 is attached to an indentation 23 formed in the material of the casing 2. Attachment may be made via adhesive, or the like. FIG. 3(b) shows a third embodiment of a magnetic initializing means 20 according to the invention. According to this embodiment, the yoke 21 is provided with openings 24 therein for attachment to the casing 2 via ultrasonic welding, or the like. According to the fourth embodiment, as pictured in FIG. 3(c), the yoke 21 of the magnetic initializing means 20 is affixed to the casing 2 via an outsert molding process. It will be understood that, according to provision of the magnetic initializing means 20 within the magneto-optical disk cartridge 1 according to any of the above-described constructions, the magnetic properties established by the initializing magnets 22, 22, 22, 22, are maintained in the preferred manner.

Figure 4:
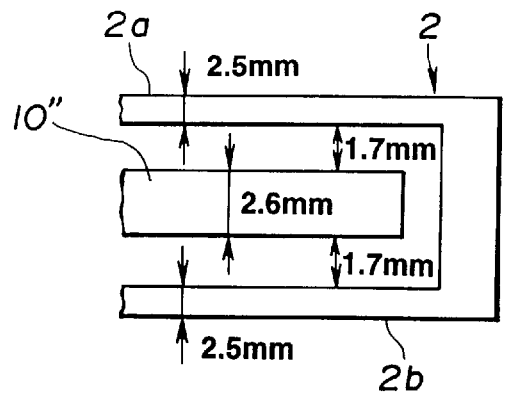
FIGS. 4(*a*), 4(*b*) shown dimensions of an interior space of a disk cartridge at portions with and without the magnetic initializing means.
Figure 4:
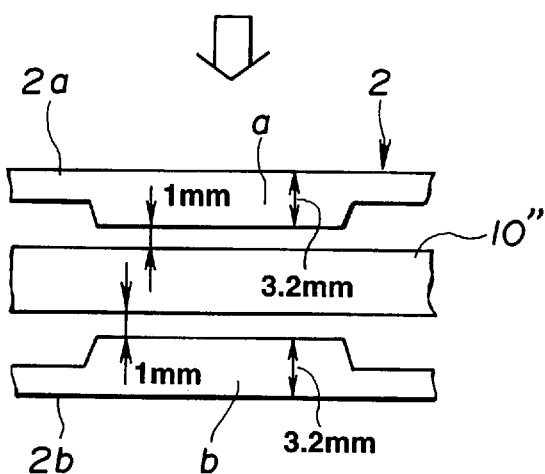
Figure 4:
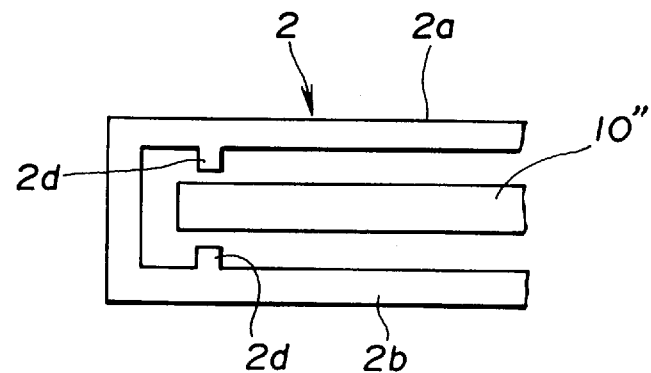

Referring to FIG. 4, the thickness dimensions of such a overwritable magneto-optical disk cartridge 1" according to a preferred embodiment of the invention are set forth specifically. It will be noted that a conventional magneto-optical disk 10' has a diameter of 130 mm and a maximum thickness of 3.2 mm, though a practical maximum thickness for a magneto-optical disk 10 may be about 2.6 mm. Referring to FIG. 4(a), wherein an overwritable magneto-optical disk 10" having a thickness of 2.6 mm is utilized, the upper and lower shells 2a, 2b, available for installation of the magnetic initializing means 20, has a shell thickness of 2.5 mm and, a clearance provided between the disk surface and the facing inner side of the shell is 1.7 mm on each side. Thus a total thickness of the magneto-optical disk cartridge 1 becomes 11 mm. FIG. 4(b) shows a cross-section of the magneto-optical disk cartridge 1" at a point of installation of the magnetic initializing means 20. As may be seen from the drawing, thicker portions a, b of the upper and lower shells 2a, 2b, are provided for providing the magnetic initializing means 20. The thicker portions a, b have a thickness of 3.2 mm respectively while a clearance of 1 mm is provided between the disk surface and the facing inner side of the shell on each side. It will be noted that, at the thicker portions a, b, a shell material thickness of 0.7 mm, a yoke thickness of 0.5 mm and an initializing magnet 22 thickness of 2.0 mm respectively, may be practically realized. Thus, even with installation of the magnetic initializing means 20, the total thickness of the magneto-optical disk cartridge 1" is unchanged.

Referring now to FIG. 4(c), it will be noted, that, due to the reduced clearance available for rotation of the overwritable magneto-optical disk 10" there is a danger that a circumferential portion of the magneto-optical disk 10" may come into contact with the upper or lower shell 2a, 2b during rotation and disrupt reading and/or writing of data on the magneto-optical disk 10". Thus, a further feature of the present invention is provision of protection portions 2d which are projected from inner surfaces of the upper and lower shells 2a, 2b respectively for supporting a circumferential edge of the magneto-optical disk 10". According to provision of the protect portions 2d, the magneto-optical disk 10" may be securely seated within the magneto-optical disk cartridge 1" and stable operation of the magneto-optical disk cartridge 1" may be reliably obtained.

Thus, according to the invention an overwritable magneto-optical disk cartridge 1" utilizing an overwritable magneto-optical disk 10" overwritable according to the light intensity modulation method and including magnetic initializing means 20 within the cartridge housing, may be provided in a casing 2 having the same external appearance and dimension as a conventional magneto-optical disk cartridge 1'. Further, since no major design changes are involved in arrangement of the magneto-optical disk cartridge 1" according to the invention, the improvements cited above may be implemented at minimal cost. Also, provision of the cartridge 1" according to the invention allows a weight, size and complexity of a magneto-optical disk drive compatible with both conventional and overwritable type disk cartridges 1 to be reduced. Specifically, since the overwritable magneto-optical disk cartridge 1" according to the invention contains therein the magnetic initializing means 20, the bulky magnetic initializing means 115 of the disk drive 100 and the drive mechanism therefor are not required. Further, a gap for allowing the magnetic initializing means 115 to be distanced from the cartridge 1 when a conventional magneto-optical disk cartridge 1' is loaded is not required. Thus, in a single step, all of size, weight and cost of such a compatible disk drive may be reduced. In addition, since the magnetic initializing means 20 of the invention provides initializing magnets within the casing 2 of the cartridge 1 adjacent the surface of the magneto-optical disk 10, a strong and stable magnetic field may be reliably obtained.

Also, since the magnetic disk 10" confronts the initializing magnets 22 of the magnetic initializing means 20 at a very short distance, the magnetic initializing means 20 according to the invention may be made extremely small. It will further be noted that, according to the above-described embodiment, although the magnetic initializing means 20 is provided at a side below a shutter 4 of the cartridge casing 2, the magnetic initializing means 20 may be provided in parallel with the shutter 4, or in any other location within the cartridge casing 2.

Hereinbelow, additional alternative embodiments of an overwritable magneto-optical disk cartridge 1" according to the invention will be explained in detail with reference to FIGS. 5(a)–5(c).

FIG. 5(a) shows an alternative embodiment of a magnetic initializing means 20' according to the invention. According to this embodiment, according to this, the upper and lower arms 21a, 21c of the yoke 21 are respectively provided with only a single initializing magnet 22. With such construction the cost of providing such a magnetic initializing means 20' within the cartridge casing 2 may be further reduced.

FIG. 5(b) shows an embodiment in which a yoke 21 mounting a single initializing magnet 22 is provided opposing only one surface of the overwritable magneto-optical disk 10".

FIG. 5(c) shows an alternative embodiment of a magnetic initializing means 20" in which a single initializing magnet 22 is provided opposing a lower surface of the magneto-optical disk 10". The initializing magnet 22 is provided on a lower arm 21c of a reversed 'C' shaped yoke 21.

Figure 5:
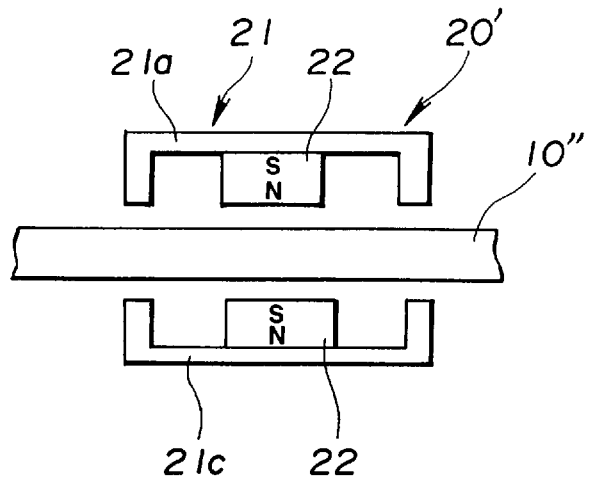
FIGS. 5(*a*)–5(*c*) show additional alternative embodiments of a magnetic initializing means provided within a cartridge casing according to the invention.
Figure 5:
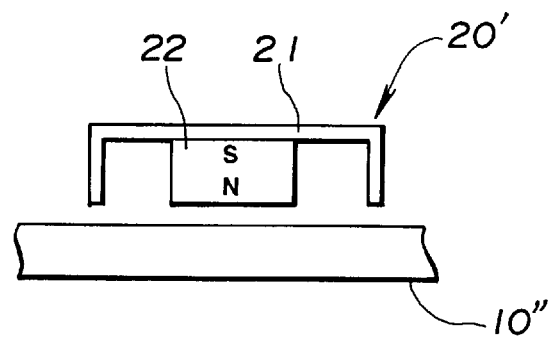
Figure 5:
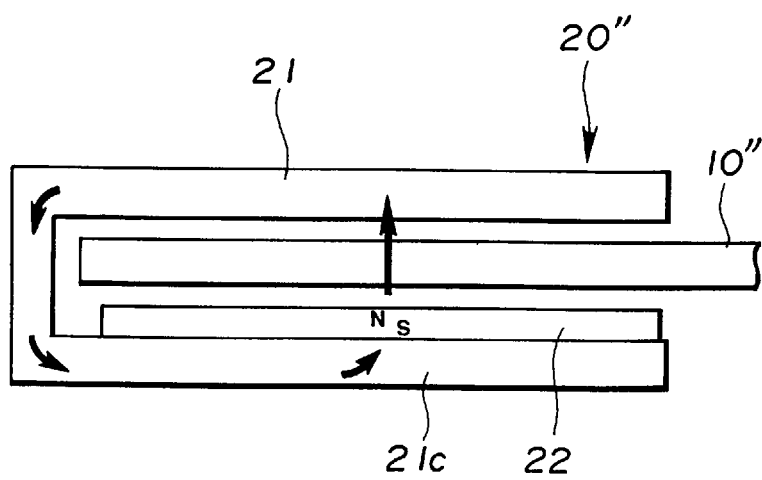

It will be understood that, according to the above-described alternative embodiments shown in FIG. 5, manufacturing costs for an overwritable magneto-optical disk cartridge 1" including an internally provided magnetic initializing means 20 (20', 20") may be considerably reduced while the same advantages may be obtained as in the previous embodiments described in reference to FIGS. 1–4.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the preferred shown embodiments which can be effected without departing from the principle spirit or scope of the invention as set forth in the appended claims.

What is claimed is:

1. A disk cartridge comprising:

a cartridge casing;

an overwrite type magneto-optical disk rotatably mounted in the cartridge casing; and magnetic initializing means, including a yoke and magnetic means disposed within the cartridge casing proximate to a radial portion of the overwrite type magneto-optical disk so as to generate a magnetic field sufficient for effecting overwrite operation of the overwrite type magneto-optical disk;

wherein the yoke of the magnetic initializing means comprises an upper arm and a lower arm arranged such that a radial portion of the overwrite type magneto-optical disk passes between the upper and lower arms of the magnetic initializing means according to rotation thereof; and wherein the magnetic means comprises a pair of upper initializing magnets disposed in parallel on the inner surface of the upper arm of the yoke and a pair of lower initializing magnets disposed in parallel on the inner surface of the lower arm of the yoke both of the upper and lower pairs of the initializing magnets being arranged in parallel to a radial direction of the disk such that a radial portion of the overwrite type magneto-optical disk passes between the initializing magnets during rotation thereof.

2. A disk cartridge as set forth in claim 1, wherein the upper pair of initializing magnets are arranged in reversed polarity such that an S pole of an upper right side initializing magnet, from the pair of upper initializing magnets, faces an upper surface of the overwrite type magneto-optical disk while an N pole of an upper left side initializing magnet, from the pair of upper initializing magnets, faces the upper surface of the overwrite type magneto-optical disk, while the lower pair of initializing magnets are arranged to face the lower surface of the overwrite type magneto-optical disk such that an N pole of a lower right side initializing magnet, from the pair of lower initializing magnets, faces a lower surface of the overwrite type magneto-optical disk while an S pole of a lower left side initializing magnet, from the pair of lower initializing magnets, faces the lower surface of the overwrite type magneto-optical disk so as to establish a substantially circular, counterclockwise magnetic field.

3. A disk cartridge, comprising:

a cartridge casing;

an overwrite type magneto-optical disk rotatable mounted in the cartridge casing; and magnetic initializing means, including a yoke and magnetic means disposed within the cartridge casing proximate to a radial portion of the overwrite type magneto-optical disk so as to generate a magnetic field sufficient for effecting overwrite operation of the overwrite type magneto-optical disk;

wherein the yoke of the magnetic initializing means comprises an upper arm and a lower arm arranged such that a radial portion of the overwrite type magneto-optical disk passes between the upper and lower arms of the magnetic initializing means according to rotation thereof; and wherein the upper and lower arms of the yoke are respectively attached to indentations formed in the material of the cartridge casing at facing upper and lower sides thereof.

4. A disk cartridge as set forth in claim 3, wherein the upper and lower arms are attached to the cartridge casing via an adhesive.

5. A disk cartridge, comprising:

a cartridge casing;

an overwrite type magneto-optical disk rotatably mounted in the cartridge casing; and magnetic initializing means, including a yoke and magnetic means disposed within the cartridge casing proximate to a radial portion of the overwrite type magneto-optical disk so as to generate a magnetic field sufficient for effecting overwrite operation of the overwrite type magneto-optical disk;

wherein the yoke of the magnetic initializing means comprises an upper arm and a lower arm arranged such that a radial portion of the overwrite type magneto-optical disk passes between the upper and lower arms of the magnetic initializing means according to rotation thereof; and wherein the upper and lower arms of the yoke are respectively provided with openings therein for attachment to facing upper and lower sides respectively of the cartridge casing via ultrasonic welding.

6. A disk cartridge, comprising:

a cartridge casing;

an overwrite type magneto-optical disk rotatably mounted in the cartridge casing; and magnetic initializing means, including a yoke and magnetic means disposed within the cartridge casing proximate to a radial portion of the overwrite type magneto-optical disk so as to generate a magnetic field sufficient for effecting overwrite operation of the overwrite type magneto-optical disk;

wherein the yoke of the magnetic initializing means comprises an upper arm and a lower arm arranged such that a radial portion of the overwrite type magneto-optical disk passes between the upper and lower arms of the magnetic initializing means according to rotation thereof; and wherein the upper and lower arms of the yoke are respectively affixed to facing upper and lower sides of the cartridge casing via an outsert molding process such that the upper and lower arms are embedded in a material of which the cartridge casing is formed.

7. A disk cartridge, comprising:

a cartridge casing;

an overwrite type magneto-optical disk rotatably mounted in the cartridge casing; and magnetic initializing means, including a yoke and magnetic means disposed within the cartridge casing proximate to a radial portion of the overwrite type magneto-optical disk so as to generate a magnetic field sufficient for effecting overwrite operation of the overwrite type magneto-optical disk;

wherein a support portion for supporting a peripheral edge of the overwrite type magneto-optical disk is projected from at least one of facing upper and lower sides of the cartridge casing.

8. A disk cartridge as set forth in claim 7, wherein a plurality of the support portions are provided.

9. A disk cartridge as set forth in claim 7, wherein the support portion is provided so as to support peripheral areas of the overwrite type magneto-optical disk at portions of a surface area thereof not utilized for reading, writing or storage of data.

* * * * *

UNITED STATES PATENT AND TRADEMARK OFFICE
CERTIFICATE OF CORRECTION

PATENT NO. : 5,859,831
DATED : January 12, 1999
INVENTOR(S) : TAKASHI NAITO ET AL.

It is certified that error appears in the above-identified patent and that said Letters Patent is hereby corrected as shown below:

In Column 7, second to last line, replace "rotatable" with --rotatably--.

Signed and Sealed this

Eighteenth Day of May, 1999

Attest:

Q. TODD DICKINSON

Attesting Officer

Acting Commissioner of Patents and Trademarks